United States Patent [19]
Harding

[11] 3,847,575
[45] Nov. 12, 1974

[54] AIR FRESHENING ASH TRAY DEVICE
[75] Inventor: Carol Harding, Mundelein, Ill.
[73] Assignee: The Raymond Lee Organization, Inc., New York, N.Y. ; a part interest
[22] Filed: Dec. 11, 1972
[21] Appl. No.: 314,153

[52] U.S. Cl................ 55/244, 55/385, 131/256, 220/20.5, 232/43.1
[51] Int. Cl............................................ B01d 47/02
[58] Field of Search ........ 55/244, 385; 21/55, 74 R; 232/43.1; 131/256; 4/258; 210/469; 220/20.5

[56] References Cited
UNITED STATES PATENTS
964,472   7/1910   Johnson .............................. 4/261
2,505,351 4/1950   Dickson .............................. 131/240
2,591,113 4/1952   Ajdukovich ........................ 131/257
2,950,723 8/1960   Elswood ............................ 131/256
3,099,270 7/1963   Garson ............................... 131/240

Primary Examiner—Bernard Nozick
Attorney, Agent, or Firm—Daniel Jay Tick

[57] ABSTRACT

An air freshening ash tray device comprises a glass bowl partially filled with water. Soda is provided at the bottom of the bowl in the water. A few drops of lightweight air are provided on the water. A wire basket is supported by the bowl at the mouth thereof and spaced from the surface of the water.

5 Claims, 3 Drawing Figures

PATENTED NOV 12 1974   3,847,575
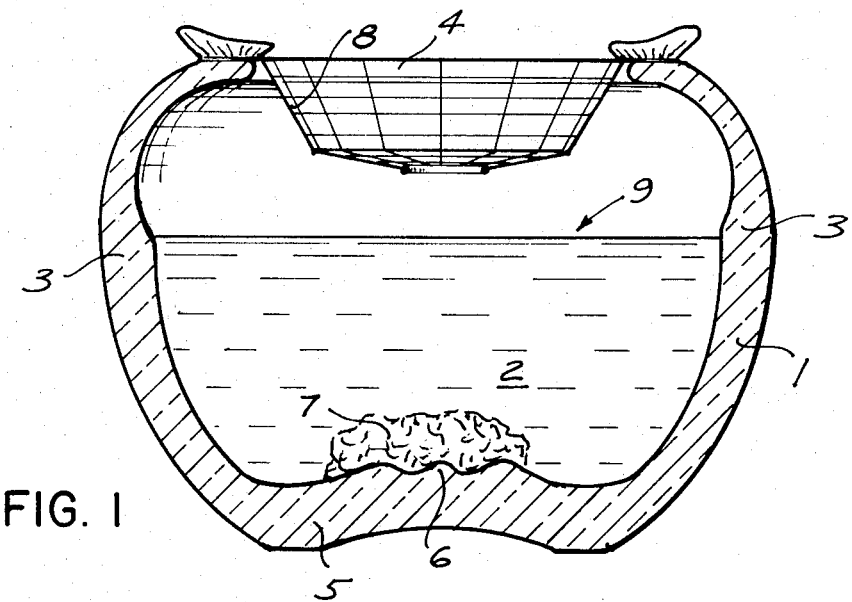
FIG. 1
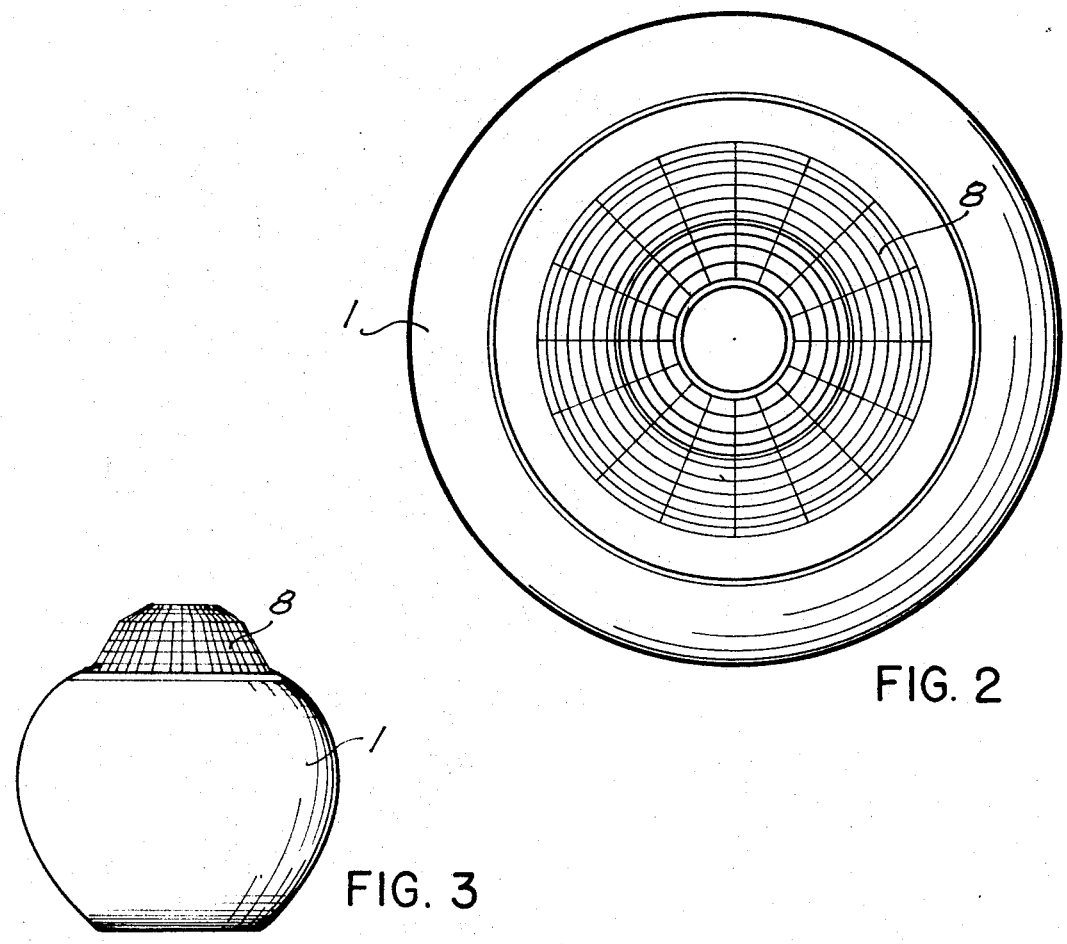
FIG. 2
FIG. 3

AIR FRESHENING ASH TRAY DEVICE

DESCRIPTION OF THE INVENTION

The present invention relates to an air freshening ash tray device.

The principal object of the invention is to provide an air freshening ash tray device which is easy and convenient to operate and maintain and which functions efficiently, effectively and reliably to freshen air, reduce smoke and odors and store ashes safely.

In order that the invention may be readily carried into effect, it will now be described with reference to the accompanying drawing, wherein:

FIG. 1 is a sectional view of an embodiment of the air freshening ash tray device of the invention utilized as an ash tray;

FIG. 2 is a top view of the embodiment of FIG. 1; and

FIG. 3 is a side view of a modification of the embodiment of FIGS. 1 and 2 utilized as an air freshener.

In the FIGS., the same components are identified by the same reference numerals.

The air freshening ash tray device of the invention comprises a glass bowl 1 (FIGS. 1, 2 and 3) partially filled with water 2 (FIG. 1). The bowl 1 preferably comprises opaque, white, non-shiny glass and is of varying thickness. The bowl 1 is preferably in an approximate configuration of an apple with the thickness the greatest at the area 3 of the diameter (FIG. 1) and tapering off toward the mouth 4 and the bottom 5 (FIG. 1).

The center 6 of the bottom of the bowl 1 (FIG. 1) is of wavy configuration. Soda 7 (FIG. 1) such as bicarbonate of soda or washing soda is provided at the center 6 of the bottom 7 of the bowl 1. A suitable amount of soda is about one or two teaspoons.

A few drops of lightweight oil such as, for example, cooking oil, are provided on the water 2.

A wire basket 8 (FIGS. 1, 2 and 3) is supported by the bowl at the mouth 4 thereof and spaced from the surface 9 (FIG. 1) of the water 2. The wire basket 8 is of substantially frustoconical configuration and is suspended in the bowl 1 from the mouth 4 thereof and spaced from the surface 9 of the water 2, as shown in FIGS. 1 and 2, when the device is used as an ash tray.

When the device is used as an air freshener, only, as shown in FIG. 3, the wire basket 8 is supported by the bowl 1 at its mouth and extends out of the bowl for maximum air freshening.

The device of the invention is designed to pull the smoke to the soda water, thus preventing the spreading and accumulating of smoke in the room. This gives relief to the non-smoker as well as the smoker by diminishing smoke and odor. The proportions of soda and water are increased for group use.

The soda pulls everything to itself, with both smoke and ashes sinking rapidly to the bottom of the bowl. The water level needs to be close to the inner thickness of the bowl. A strong motion downward begins with the tension of the thicker wall. The slight wave shape of the bottom of the bowl gives a stopping of air motion at the soda, which needs no mixing. Bicarbonate of soda is preferable, although washing soda also works with a slower reaction time with a slight odor of its own. The soda need be increased only slightly with a larger bowl. Water needs more of an increase. One to three drops of oil will increase the clearing of the air of odors. The bowl, without the wire basket, with oil and soda solution could be used to purify room air with no smoking being done.

The bowl is shaped to provide a strong pull downward, as is the basket. A cigarette left on the edge of the mouth should fall inward. The water decreases the danger of fire both from accumulation of butts and forgotten burning cigarettes. The metal of the wire basket may comprise any metal that is firm and without odor. The shine should be of dull or satin finish, so the easier cleaning requires no polishing, and does not attract too much attention. The mesh of the basket must be widely enough spaced to allow ashes to fall through. The ends may be discarded in the center hole.

The preferred material for the bowl is opaque white glass. The pull will be stronger if light rays do not come through the material. White reflects all light rays. A soft white or off-white would cause less notice of the outside shape than a bright white or a too-shiny surface. Glass is the best material, for a single layer of material increases downward motion, whereas a three-layered wall of glazed china or pottery would give more pull to sides with pull down. China or pottery may be utilized, but is not as efficient or durable as glass, seepage is more possible and cracking without breaking is also possible.

The evaporation of the water leaves a salt of soda ashes which may be removed without unpleasantness, which leaves a clean bowl, and which may be added to the soil of the garden.

The wire basket fits over the opening of the glass bowl without any clamp or fastening, as a strainer fits over a teapot. The purpose of the basket is to provide a place for setting a cigarette down during smoking, as well as providing a place of disposal. The wire mesh should be strong enough to continue to hold its shape, but no larger wire or wider spaces than are necessary should be used. The lightest weight and the least shininess improves the pull into the bowl itself. When the ash tray is used as a room air cleaner, inverting the wire basket attracts air to itself, giving a stronger pull to the water inside.

For use as an air cleaner, a soda solution, as with the ash tray, may pull general odors into the container. Three or so drops of any lightweight oil pulls in odors carried by fat, especially kitchen odors or bathroom odors. The soda solution may be replenished when the water has evaporated. The replenishment frequency depends upon local condition of air flow, temperature, and humidity. No damage is done until the bowl is dry. The bowl should be placed sufficiently far from walls and other objects to receive normal motion of the surrounding air; not in extreme positions of low or high or immediately next to the source of the odor.

For use as an air cleaner in a room of one predominantly strong odor, particularly in closets, store rooms of furniture, or one kind of material, fabric stores, and generally closed-in places, a salt solution instead of a soda solution provides a strong absorbing of a single odor, as well as activating air not in motion. Salt in the amount of the soda is a guide for measurement, though no exact measuring is required. Even after the water has evaporated, the salt continues to be active. Forgetting to add a new solution is thus no danger. Salt climbs out of the bowl to the wire basket. Thus, the bowl should be placed in a clear space immediately surrounding it, preferably near nose level, or nearer the flow.

Simplicity of cleaning and of filling encourages regular using of the device. No decoration of any kind should be added, for any distraction of the air moving to the inside will diminish the strength of the pull to the inside. Both the air and the eyes need relief from too much distraction.

For use in a place of strong medical odors and strong cleaning odors, as in a nursing home or hospital, salt solution may be used by itself, or be cleared more with the addition of a few granules of charcoal. This also is useful in places of static air, where salt odor by itself would irritate the nostrils. A particular place requiring this kind of cleaning and stimulation is under beds, closed in by bedspreads hanging to the floor, and under sofas, also closed in. A smaller amount of solution may be sufficient for a small space, as under a sofa.

The size of the ash tray may be larger than the drawing, as long as the proportions are pleasing, and as long as the openings of the bowl and the wire basket are not too much larger than the drawing spaces. In a room where several people are smoking, a few shared ash trays will clear the air better than an ash tray per person. This is particularly true of a conference table closeness, although many people smoking constantly in a closed room cannot be fully counteracted with any other absorption device. However, in such a situation, a stronger soda solution, preferably washing soda rather than baking soda, with more frequent changes of solution, will counter the static odor accumulating more than any other method of absorption or circulating air.

I claim:

1. An air freshening ash tray device, comprising
   a substantially symmetrical glass bowl having an open mouth at the top thereof and curving inwardly at the mouth, said bowl being partially filled with water;
   soda at the bottom of the bowl in the water;
   a few drops of lightweight oil on the water; and
   a wire basket of concentric wire rings of different diameters depending into the bowl mounted on and supported by the bowl at the mouth thereof and spaced from the surface of the water whereby smoke and odors are drawn to the bottom of the bowl.

2. An air freshening ash tray device as claimed in claim 1, wherein the center of the bottom of the bowl is of wavy configuration and about two teaspoons of soda are at the center of the bottom of the bowl.

3. An air freshening ash tray device as claimed in claim 2, wherein the bowl is of varying thickness in approximate configuration of an apple with the thickness the greatest at the area of greatest diameter and tapering off toward the mouth and the bottom.

4. An air freshening ash tray device as claimed in claim 3, wherein the wire basket is of substantially frustoconical configuration and is suspended in the bowl from the mouth thereof.

5. An air freshening ask tray device as claimed in claim 4, wherein the bowl comprises opaque, white, non-shiny glass.

* * * * *